US009754042B2

(12) United States Patent
Khosla et al.

(10) Patent No.: US 9,754,042 B2
(45) Date of Patent: *Sep. 5, 2017

(54) ENHANCED FAVORITES SERVICE FOR WEB BROWSERS AND WEB APPLICATIONS

(71) Applicant: AOL Inc., Dulles, VA (US)

(72) Inventors: Aditya Khosla, Mountain View, CA (US); Brock Laporte, San Carlos, CA (US); Alberto Cobas, Scotts Valley, CA (US); Colin Chang, San Jose, CA (US); Joseph Van Valen, Travis AFB, CA (US)

(73) Assignee: Oath Inc., Dulles, VA (US)

( * ) Notice: Subject to any disclaimer, the term of this patent is extended or adjusted under 35 U.S.C. 154(b) by 525 days.

This patent is subject to a terminal disclaimer.

(21) Appl. No.: 14/283,099

(22) Filed: May 20, 2014

(65) Prior Publication Data

US 2014/0258824 A1    Sep. 11, 2014

Related U.S. Application Data

(63) Continuation of application No. 11/197,681, filed on Aug. 3, 2005, now Pat. No. 8,739,020.

(51) Int. Cl.
*G06F 3/048* (2013.01)
*G06F 17/30* (2006.01)
*H04L 29/08* (2006.01)
*G06F 3/0481* (2013.01)
*G06F 17/22* (2006.01)

(52) U.S. Cl.
CPC .... *G06F 17/30896* (2013.01); *G06F 3/04817* (2013.01); *G06F 17/2235* (2013.01); *G06F 17/2247* (2013.01); *H04L 67/26* (2013.01)

(58) Field of Classification Search
CPC .................................................. G06F 17/2235
See application file for complete search history.

(56) References Cited

U.S. PATENT DOCUMENTS

| | | | |
|---|---|---|---|
| 5,922,044 A | 7/1999 | Banthia | |
| 6,208,995 B1 * | 3/2001 | Himmel | ............ G06F 17/30884 |
| 6,782,430 B1 | 8/2004 | Cragun | |
| 6,784,900 B1 | 8/2004 | Dobronsky et al. | |

(Continued)

FOREIGN PATENT DOCUMENTS

GB            2352600          1/2001

OTHER PUBLICATIONS

"RSS and Live Bookmarks" available online at web.archive.org/web/20041204060926/http://johnbokma.com/firefox/rss-and-live-bookmarks.html, archived Dec. 4, 2004.*

*Primary Examiner* — Matthew Ell
(74) *Attorney, Agent, or Firm* — Finnegan, Henderson, Farabow, Garrett & Dunner, LLP

(57) ABSTRACT

The invention provides two enhancements for the use of favorites during a Web browsing session. A first enhancement identifies when a user is adding a favorite to his favorites list and auto-suggests a category under which the favorite could be stored. A second enhancement allows a user to review his favorites list and see a summary of feed content (RSS or other standard) on each feed enabled page on his favorites list, without requiring the user to link to the page in question.

19 Claims, 6 Drawing Sheets

(56) References Cited

U.S. PATENT DOCUMENTS

| | | |
|---|---|---|
| 6,832,350 B1 * | 12/2004 | Bates ................ G06F 17/30884 707/999.001 |
| 6,868,525 B1 | 3/2005 | Szabo |
| 6,959,339 B1 | 10/2005 | Wu et al. |
| 6,973,456 B1 | 12/2005 | Elgart |
| 7,031,961 B2 | 4/2006 | Pitkow et al. |
| 7,065,520 B2 | 6/2006 | Langford |
| 7,073,121 B2 | 7/2006 | Brown et al. |
| 7,080,139 B1 | 7/2006 | Briggs et al. |
| 7,181,438 B1 | 2/2007 | Szabo |
| 7,321,918 B2 | 1/2008 | Burd et al. |
| 7,366,996 B2 | 4/2008 | Hoyle |
| 7,373,358 B2 | 5/2008 | Ronnewinket et al. |
| 7,451,152 B2 | 11/2008 | Kraft et al. |
| 7,596,533 B2 | 9/2009 | Szabo et al. |
| 7,702,675 B1 | 4/2010 | Khosla et al. |
| 2003/0184583 A1 | 10/2003 | Lim |
| 2003/0212904 A1 | 11/2003 | Randle et al. |
| 2004/0001081 A1 | 1/2004 | Marsh |
| 2004/0003118 A1 | 1/2004 | Brown et al. |
| 2004/0049514 A1 | 3/2004 | Burkov |
| 2004/0189695 A1 | 9/2004 | Kurtz et al. |
| 2004/0220898 A1 * | 11/2004 | Eguchi .............. G06F 17/30259 |
| 2004/0267779 A1 | 12/2004 | Carter et al. |
| 2005/0050472 A1 | 3/2005 | Faseler et al. |
| 2005/0165615 A1 | 7/2005 | Minar |
| 2005/0188403 A1 | 8/2005 | Kotzin |
| 2005/0198056 A1 | 9/2005 | Dumais et al. |
| 2005/0198125 A1 | 9/2005 | Macleod Beck et al. |
| 2005/0198153 A1 * | 9/2005 | Keohane ............. G06Q 10/107 709/206 |
| 2005/0203917 A1 | 9/2005 | Freeberg et al. |
| 2005/0216825 A1 | 9/2005 | Teague |
| 2005/0234940 A1 | 10/2005 | Apparao et al. |
| 2005/0246626 A1 * | 11/2005 | Lai .................... G06F 17/30896 715/234 |
| 2005/0283734 A1 | 12/2005 | Santoro et al. |
| 2005/0289468 A1 | 12/2005 | Kahn et al. |
| 2006/0073812 A1 | 4/2006 | Punaganti et al. |
| 2006/0095507 A1 | 5/2006 | Watson |
| 2006/0155698 A1 * | 7/2006 | Vayssiere .......... G06F 17/30899 |
| 2006/0167860 A1 | 7/2006 | Eliashberg et al. |
| 2006/0173985 A1 | 8/2006 | Moore |
| 2006/0230021 A1 * | 10/2006 | Diab ................. G06F 17/30873 |
| 2006/0242554 A1 | 10/2006 | Gerace et al. |
| 2006/0259462 A1 | 11/2006 | Timmons |
| 2006/0265394 A1 | 11/2006 | Raman et al. |
| 2006/0265396 A1 | 11/2006 | Raman et al. |
| 2006/0288011 A1 | 12/2006 | Ghandi et al. |
| 2007/0011665 A1 | 1/2007 | Ghandi et al. |
| 2007/0016609 A1 | 1/2007 | Kim et al. |
| 2007/0022419 A1 | 1/2007 | Subbarao et al. |
| 2007/0033290 A1 | 2/2007 | Valen, III et al. |
| 2007/0033517 A1 | 2/2007 | O'Shaughnessy et al. |
| 2007/0050446 A1 | 3/2007 | Moore |
| 2007/0050734 A1 | 3/2007 | Busey |
| 2007/0083520 A1 | 4/2007 | Shellen et al. |
| 2007/0094389 A1 | 4/2007 | Nussey et al. |
| 2007/0198943 A1 | 8/2007 | Grason et al. |
| 2009/0013266 A1 | 1/2009 | Ghandi et al. |

* cited by examiner

ENHANCED FAVORITES SERVICE FOR WEB BROWSERS AND WEB APPLICATIONS

This application is a continuation of U.S. application Ser. No. 11/197,681, filed on Aug. 3, 2005 (now allowed), the disclosure of which is expressly incorporated herein by reference to its entirety. This application is related to U.S. application Ser. No. 11/332,883, filed on Jan. 17, 2006 (now abandoned), U.S. application Ser. No. 11/424,452, filed on Jun. 15, 2006 (now pending), U.S. application Ser. No. 11/558,910, filed on Nov. 11, 2006 (now U.S. Pat. No. 7,702,675), and PCT Application No. PCT/US06/30588, filed on Aug. 3, 2006 (now expired).

BACKGROUND OF THE INVENTION

Technical Field

The invention relates to management and viewing of "favorites" or "bookmarks". More particularly, the invention relates to an enhanced favorites service built in to a Web browser as well as available from a web site, accessible from any web browser.

Description of the Prior Art

Web browsing has evolved into a sophisticated information management process. Web browsing sessions produce such information that the user may wish to access at a later time. Currently, users save Web pages of interest as "favorites". Each favorite is manually cached by the user in one of several subject matter relevant folders. This process is both inefficient and inexact. The user must make a decision based on imperfect information, i.e. the user may not have fully reviewed the content of the page that is being added to his favorites list, and thus places the page in the wrong category. The later retrieval of such favorite information may be hampered by such wrong categorization.

It would be advantageous to provide an automatic and consistent approach to organizing favorites.

Further, many such favorites have feeds (conforming to RSS or other standards) associated with them. RSS (Really Simple Syndication) is a format for syndicating news and the content of news-like sites, including major news sites such as Wired, news-oriented community sites such as Slashdot, and personal web logs. Once information about each item is in RSS format, an RSS-aware program can check the feed for changes and react to the changes in an appropriate way (see http://www.xml.com/pub/a/2002/12/18/dive-into-xml.html). Currently, Web pages that have associated RSS feeds provide a list of RSS items when the page is linked to. Modern browsers, such as Safari (Apple Corp. Cupertino, Calif.) provide an icon that indicates that such pages contain RSS content. Such browsers also indicate the presence of new RSS content in a favorites list with an indicium, such as an icon or numeric indication. Unfortunately, there is no way for a user to review a favorites list and determine if any of the information on the linked page is of interest, except to follow the link to the page in question and review the information at the page itself. Because much of the RSS information is duplicated over many Websites, a user invariably wastes time reviewing information he has already seen.

It would therefore be advantageous to provide a mechanism that allowed a user to review RSS content without having to link to the page which provides such content.

SUMMARY OF THE INVENTION

The invention provides two enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other format) automatically displayed in-line with each feed enabled web site in his favorites list, without requiring him to explicitly to link to the feed URL in question.

DETAILED DESCRIPTION OF THE INVENTION

The invention provides two enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other format) automatically displayed in-line with each feed enabled web site in his favorites list, without requiring him to explicitly to link to the feed URL in question.

In the presently preferred embodiment, when a user is engaged in a Web browsing session with a browser such as Safari or Firefox, the user may bookmark a Web page of interest for later retrieval and review. The bookmark, also referred to as a favorite, is sent to a host for storage and also sent to a metadata server. The metadata server performs a lookup of the URL and/or other information associated with the bookmarked page for category information and/or for RSS information. The browser, i.e. the user client, can also retrieve relevant information from the Web page. The metadata server makes associations and returns these to the user.

In the case of an RSS feed associated with a bookmarked page, the application (web browser or web application) shows an icon relative to the bookmark. Clicking on the icon retrieves the most recent "headlines" for the feed. The client application periodically checks for new headlines. When the user selects a list of bookmarks, each bookmark in the list that has an associated RSS feed, displays the headlines corresponding to the most recent headlines for the in-line with the bookmark list. In the presently preferred embodiment, the five most recent headlines are shown for each RSS enabled Web page in the list. The actual number of headlines, amount of text presented, and update frequency may be set to default values or they may be set by the user in a preference pane. Additionally, a refresh button may be provided.

In the case of automatically organizing bookmarks as they are acquired, The URL and/or other relevant information of a page being bookmarked is referenced by the metadata server to a hierarchical classification scheme, such as that of the Open Directory Project (http://www.dmoz.org). A folder suggestion is returned to the user that identifies a most likely folder for saving the bookmark. The user may select the suggested folder, or he may save the bookmark in any other folder, or create a new folder.

The following discussion details a presently preferred implementation of the invention.

Feed Integration

Figure 1:
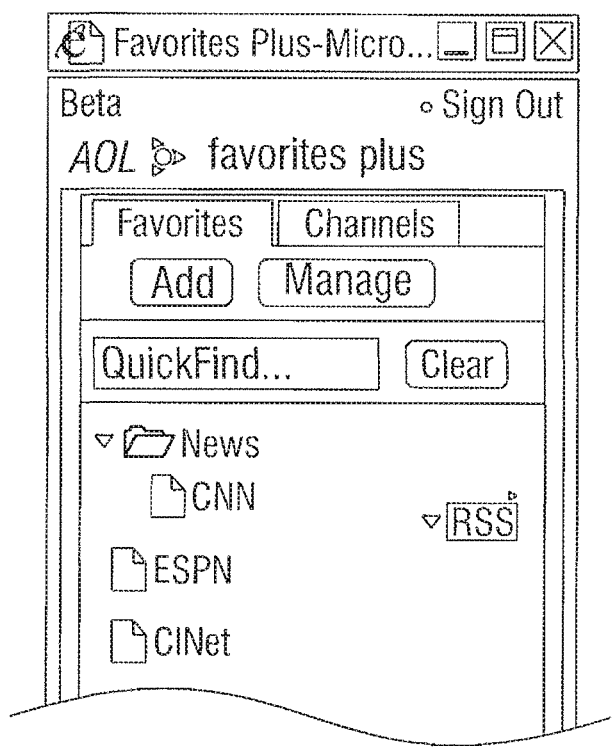
FIG. 1 is a screen shot showing RSS integration in a collapsed view according to the invention.

Functions. When a new favorite is added, part of the process in the background is finding an associated feed (RSS/Atom or other format). If a feed can be found (with associated headlines), a feeds icon, shown in FIG. 1 as "RSS", is displayed to the right of the favorite. Additionally, another tree control appears next to the favorite icon. Finally, an additional feature is to display a feeds/new feeds differentiation integrated in the folder icon, in case all folders are closed when new feeds are fetched. This applies to all parent folders of URLs with feeds. The new feed status shows if there are one or more new feeds contained anywhere in the folder or enclosed folders.

Interaction. Clicking on the title of the favorite takes the user to the favorite place. However, clicking on the "RSS" icon on the right, or expanding the new tree control accesses additional features.

Figure 2:
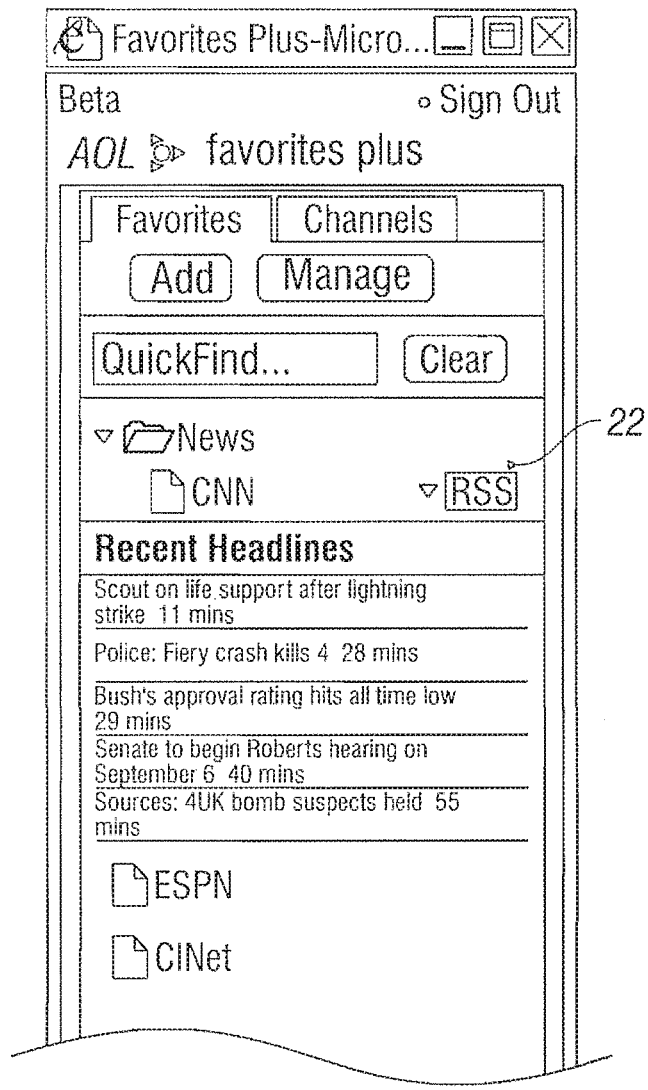
FIG. 2 is a screen shot showing RSS integration in an expanded view according to the invention.

FIG. 2 shows RSS integration in an expanded view according to the invention. Once the tree control for the favorite is expanded, it displays the top five headlines, ordered by descending date, of the associated feed. Because screen space is at a premium, the preferred embodiment only displays the first few characters of the headline, and truncates it after that. Clicking on any of the headlines takes the browser to the link associated in the feed. Note that an icon 22, i.e. a "sun", indicates that new articles are present.

Those skilled in the art will appreciate that any number of headlines may be displayed and that such headlines may be displayed in any order. Additionally, a user preference dialog may be provided to allow the user to select such parameters as number of headlines displayed, order of display, and number of characters to display, for example.

Figure 3:
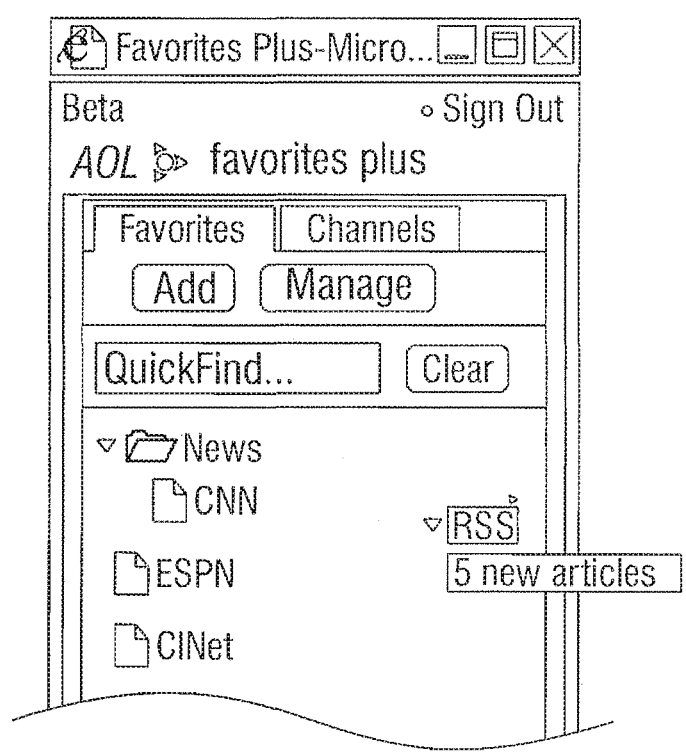
FIG. 3 is a screen shot showing an RSS hover state according to the invention.

FIG. 3 is a screen shot showing an RSS hover state according to the invention. To give the user some notification that a feed has been updated, the icon showing that a favorite has a feed preferably has two states. The default state and an updated state, which is shown if a feed has been updated in the last hour in this example. Note that for accessibility reasons, contrast should be more important than color as a change indicator for this icon. Hovering over the new feeds icon shows the number of new feeds. No hover state is provided for normal state "RSS" icon, i.e. there are no new feeds.

Add Favorite

Figure 4:
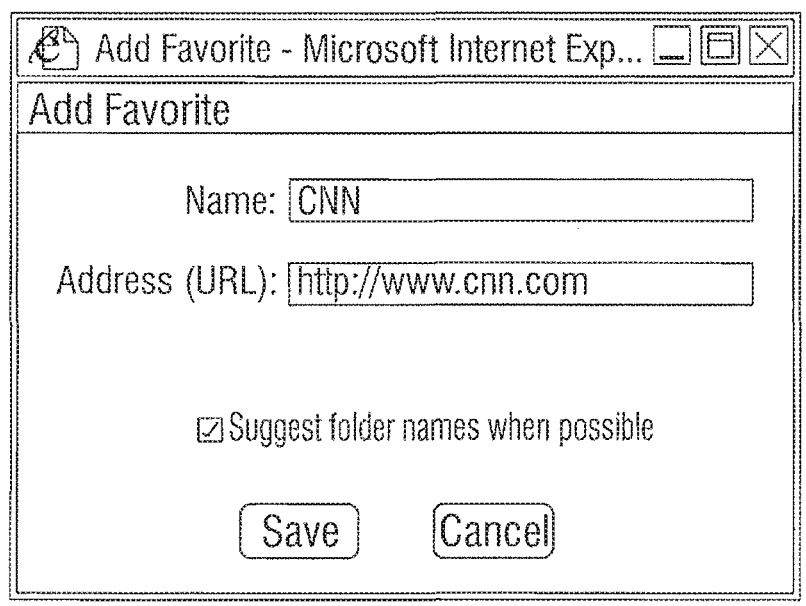
FIG. 4 shows an add favorite form according to the invention.

Add Favorite Window. FIG. 4 shows an Add Favorite form according to the invention. When the user clicks the "Add" button, or selects "Add Favorite . . . " from the favorites menu, the Add Favorite flow begins.

Add Favorite Form Functions. The user first selects one of the radio button options. "Select a Folder" is the default option. If the user has the "Suggest folder names" feature turned on, there is an initial delay with progress feedback while the browser retrieves that information. During this time, the folder pull-down menu is disabled, and an animated loading label is displayed. Also, note that the save button is disabled during this interaction. In the case that the user has turned off the folder suggestion, all of this goes away, and a folder pull-down menu is provided. If this option is turned off, such state is stored in the user preferences. Completion of the Add Favorite flow results in the display of an updated panel showing the favorite at the bottom of either the root of the list, or the bottom of the items inside a folder if a folder was selected prior to adding.

Folder Suggestion

Figure 5:
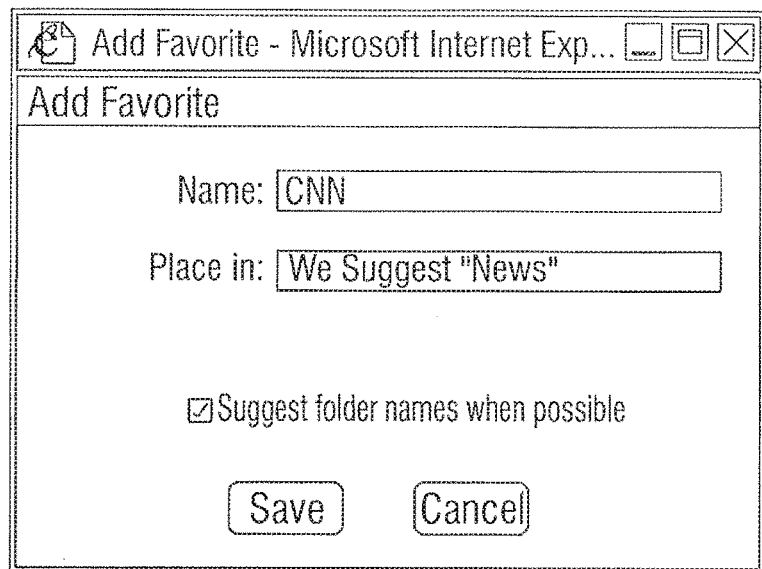
FIG. 5 is a screen shot showing folder suggestions according to the invention.

Folder Suggestion. FIG. 5 is a screen shot showing folder suggestions according to the invention. In the event that a suggested folder is found for the new favorite, the pull-down defaults to that folder. FIG. 5 shows the folder with the name boldfaced, and a special icon to denote that it is a suggested folder.

Figure 6:
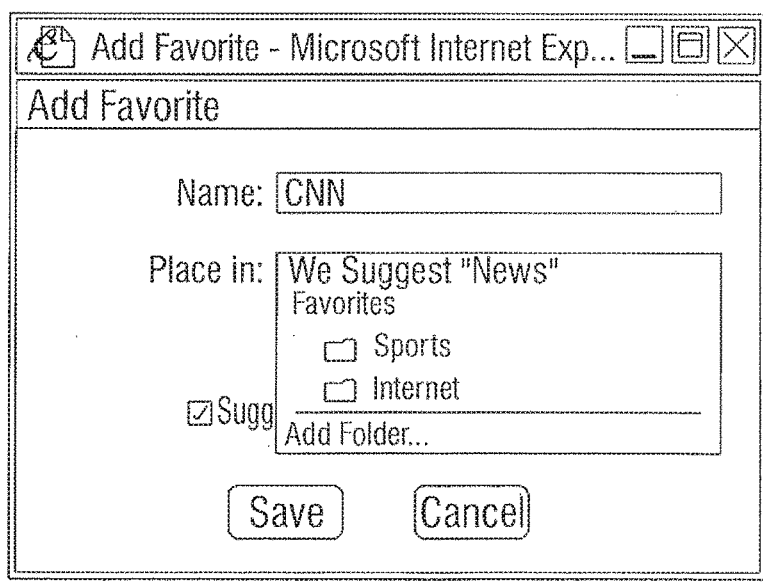
FIG. 6 is a screen shot showing a folder pull-down menu according to the invention.

Folder Pull-Down Menu. FIG. 6 is a screen shot showing a folder pull-down menu according to the invention. The folder's pull-down menu is straight forward. Preferably, the menu shows folder icons, and uses indention to represent hierarchy.

Architecture

Figure 7:
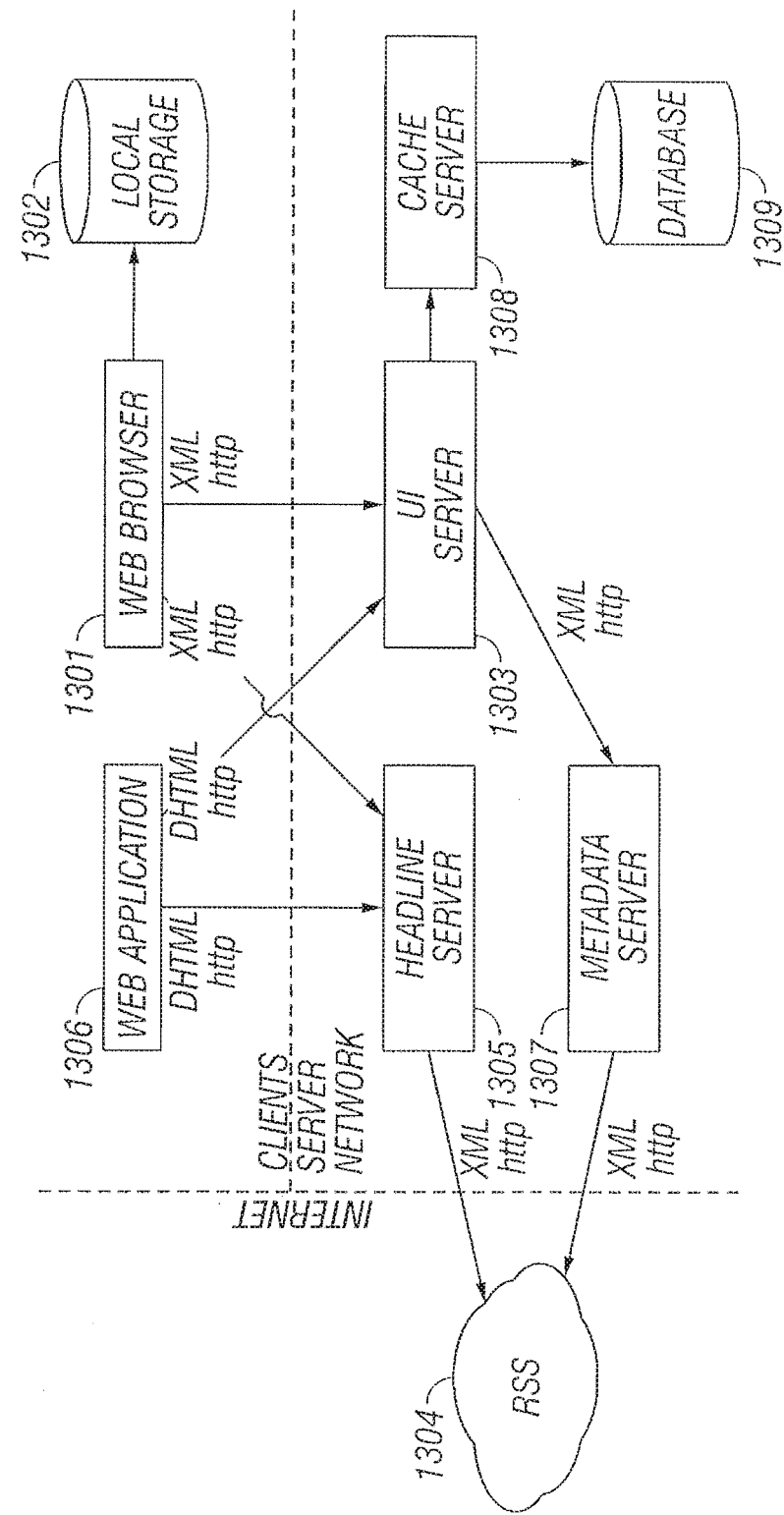
FIG. 7 is a block schematic diagram showing a preferred enhanced favorites system architecture.

FIG. 7 is a block schematic diagram showing a preferred enhanced favorites system architecture. The following is a discussion of each of the items shown in FIG. 7.

Web Browser: The web browser 71 stores the users' favorites, locally via a local storage service 72 and updates them as needed from the host.

Some information about the network connections:

a. The web browser gets and sets favorites information by issuing XML over HTTP commands to the UI server 73. On startup, the web browser issues a get request with the current version it has. If the version cached in the local store is older, the full set of favorites is downloaded from the UI server.

b. When a user adds a URL to his list of favorites, the web browser issues a request to the UI server to retrieve the associated feed URL and suggested folder name. When the user chooses a folder, the web browser then sends the URL, feed URL, title, and folder name to the host (server) for permanent storage.

c. When displaying favorites to the user, the web browser may fetch RSS feed 74 associated with favorites via the Headline server 75, taking advantage of the caching the latter performs.

2. Web Application: The Web application 76, is the UI vehicle for "enhanced favorites" outside of the web browser when the user uses any other web browser. It connects to the UI server via HTTP, and receives from it DHTML content. It receives RSS feed content when requested from the Headline server.

3. UI Server: The UI server is both a data aggregator and a presentation layer for clients.

Some information about the UI Server network connections:

a. Serves up UI and favorites metadata as DHTML to Web browsers. Receives requests from browsers to retrieve as well as to make changes to favorites using HTTP.

b. Serves up Favorite data and performs add/delete/modify operations for web browsers using XML over HTTP.

c. Serves up metadata to web browsers using XML over HTTP. To get the folder suggestion and feeds for favorites submitted it issues requests to the metadata server 77. This server analyzes the favorite URL and matches it with its internal database to come up with associated feeds and a taxonomy path. It then uses mapping rules to transform the taxonomy path into a folder suggestion. It then returns the feeds and suggested folders, which is what the client is interested in.

d. For authentication, the preferred UI server relies on the AOL standard authentication infrastructure.

4. Headline Server: The headline server serves RSS feed content (headlines and article summaries) to Web browsers or AOL Explorer clients upon request via HTTP. It isolates the web browsers from different RSS protocols, by normalizing feeds to one particular RSS format. Additionally, the server provides two interfaces, XML and DHTML, which allow simple access to feeds and headlines from almost any development platform. The headline server also allows for improved client performance by caching popular feeds and headlines and by using an HTTP connection pool to retrieve feeds from their source.

5. Enhanced Favorites Cache Complex: This element 78 caches user's favorites to reduce the load on the databases and offer a better experience for web users. The system handles requests from the UI server to add/delete/modify users' data and stores it in the DB 79 for persistence.

6. URL Metadata Server: This service can accept a request containing a URL or a set of URLs and return data about the URL or set of URLs. The kinds of data that can be returned include folder suggestions and associated feeds. Incoming query requests come from the UI server in the form of XML over HTTP.

7. Database: The database stores the users' favorites and associated information. The data is accessed by the Cache Complex.

8. RSS: This represents HTTP servers that can provide RSS and Atom feeds. These feeds might be offered by a service such as AOL or by other feed providers.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for storing a link to a web page, the method comprising the following operations performed by at least one processor:
    receiving a request to store the link;
    identifying, in response to the request, a folder based at least in part on an analysis of a universal resource locator (URL) of the web page;
    presenting the identified folder as a suggested folder in which to store the link;
    determining that a first list of links stored at a client device is an older version than a second list of links stored at a server; and
    sending the second list of links to the client device based on the determination.

2. The computer-implemented method of claim 1, wherein the identified folder is presented as a suggested folder in which to store the link within a listing of folders.

3. The computer-implemented method of claim 2, wherein the listing of folders is a hierarchy of folders.

4. The computer-implemented method of claim 1, further comprising:
    receiving an indication that a user has selected the identified folder; and
    storing the link in the identified folder based on the received indication.

5. The computer-implemented method of claim 1, wherein the request is indicative of a selection that was received from a user while the web page was presented to the user.

6. The computer-implemented method of claim 1, further comprising presenting a listing of folder options to a user, the listing of folder options including the identified folder.

7. The computer-implemented method of claim 6, wherein the identified folder is presented to the user as a default folder option in the listing of folder options.

8. The computer-implemented method of claim 1, further comprising receiving an indication that a user has selected an option to enable a folder suggestion feature, wherein the folder is identified and presented based at least in part on the received indication.

9. The computer-implemented method of claim 1, further comprising:
    identifying metadata based on the analysis of the URL;
    comparing the identified metadata with a hierarchical classification scheme to identify a taxonomy path; and
    identifying the folder based on the identified taxonomy path.

10. The computer-implemented method of claim 1, further comprising identifying, in response to the request, a feed associated with the web page based at least in part on the analysis of the URL of the web page.

11. The computer-implemented method of claim 10, further comprising presenting the link and an icon identifying the feed in the identified folder.

12. The computer-implemented method of claim 11, further comprising:
    receiving an indication that a user has selected the icon; and
    presenting a plurality of headlines in response to the received indication.

13. The computer-implemented method of claim 10, wherein the feed is a Really Simple Syndication (RSS) feed.

14. The computer-implemented method of claim 10, wherein a user may set a value for one of:
    a number of headlines to present for the feed;
    an amount of text to present for the feed; or
    a frequency with which the feed is to be updated.

15. A system for storing a link to a web page, comprising:
    a memory that stores instructions; and
    one or more processors that, when executing the instructions, are configured to:
        receive a request to store the link;
        identify, in response to the request, a folder based at least in part on an analysis of a universal resource locator (URL) of the web page;
        present the identified folder as a suggested folder in which to store the link;
        determine that a first list of links stored at a client device is an older version than a second list of links stored at a server; and
        send the second list of links to the client device based on the determination.

16. The system of claim 15, wherein the request is indicative of a selection received from a user while the web page was presented to the user.

17. The system of claim 15, wherein the one or more processors are further configured to:
    identify metadata based on the analysis of the URL;
    compare the identified metadata with a hierarchical classification scheme to identify a taxonomy path; and
    identify the folder based on the identified taxonomy path.

18. The system of claim 15, wherein the one or more processors are further configured to identify, in response to the request, a feed associated with the web page based at least in part on the analysis of the URL of the web page.

19. A non-transitory computer-readable medium storing instructions that, when executed by one or more processors, configure the one or more processors to perform a method, the method comprising:

receiving a request to store the link;
identifying, in response to the request, a folder based at least in part on an analysis of a universal resource locator (URL) of the web page;
presenting the identified folder as a suggested folder in which to store the link;
determining that a first list of links stored at a client device is an older version than a second list of links stored at a server; and
sending the second list of links to the client device based on the determination.

\* \* \* \* \*